(No Model.)

C. U. HOKE.
MEDICATED ELECTRIC BELT.

No. 385,556. Patented July 3, 1888.

WITNESSES:
E. J. Dwight.
J. A. Tegethoff

INVENTOR.
Cyrus U. Hoke,
BY W. J. Stewart,
ATTORNEY.

UNITED STATES PATENT OFFICE.

CYRUS U. HOKE, OF READING, PENNSYLVANIA.

MEDICATED ELECTRIC BELT.

SPECIFICATION forming part of Letters Patent No. 385,556, dated July 3, 1888.

Application filed March 26, 1888. Serial No. 268,461. (No model.)

*To all whom it may concern:*

Be it known that I, CYRUS U. HOKE, a citizen of the United States, residing at Reading, in the county of Berks and State of Pennsylvania, have invented certain new and useful Improvements in Medicated Electric Belts; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to electric belts intended to be worn in contact with the body for medical purposes.

It consists in combining in one belt a series of voltaic batteries adapted to generate and transmit to the body a continuous current of electricity, and suitable medicinal substances adapted to act upon the system either by counter-irritation or absorption. The drawings illustrate a method of accomplishing this.

Figure 1:
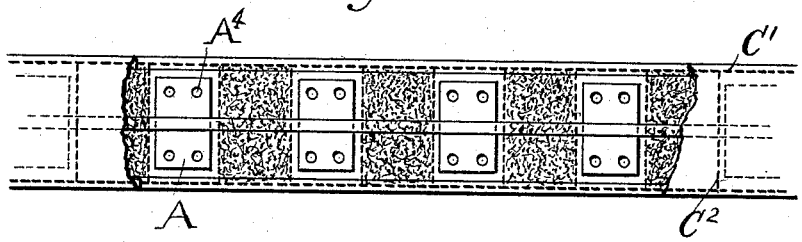
Figure 2:
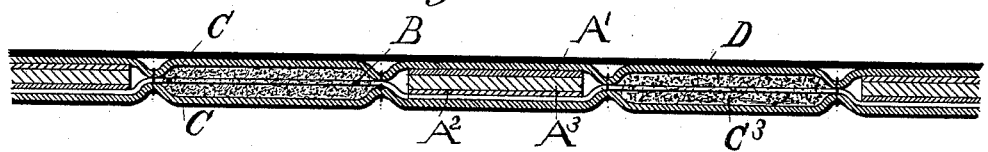

Figure 1 shows part of a belt having a portion of the facing removed to show the interior arrangement. Fig. 2 is a longitudinal section through the thickness of the belt.

A represents a single voltaic battery consisting of a copper element, $A'$, and zinc element $A^2$, with a porous material, $A^3$, between them. These batteries are separated a distance about equal to their width, and are connected by metallic conducting strips or wires B, which are in contact with the opposite elements of each successive battery. This voltaic belt is placed between two layers of flannel or similar porous material, C. Suitable medicinal substances, $C^3$, such as are mentioned later, are placed between the batteries, and the material is stitched together by longitudinal stitches $C'$ along the edges, and by vertical stitches $C^2$, which form independent medicine and battery pockets, with the conductor B passing through the former. The ends of the belt may terminate in any usual manner with opposite poles, adapted to either come in direct contact with the body or to communicate the current through the material, which may be moistened, so as to conduct it. It is buckled to the body in the ordinary way. A water-proof lining, D, may be used, to avoid soiling the clothing.

I do not desire to confine myself to any specific medicinal substances, as they may be varied to suit different cases. Mustard, salt, asafetida, sulphur, camphor, or other substances may be used, which, either by their absorptive, volatile, or irritating qualities, either act as counter-irritants or are absorbed into the system, or serve to promote perspiration or other natural functions, or which form a vapor adapted to ward off contagious disease.

It is well known that the skin, with its innumerable pores may be readily made to serve as a medium for applying medicines.

In using my belt the battery-pockets may be wetted with vinegar soaked through the face of the flannel, the copper and zinc plates being preferably perforated, as shown at $A^4$, to permit the porous material $A^3$ to be more readily wetted. The perspiration of the body may be made to generate a moderate current, especially when the medicine contained in the pockets tends to increase its amount. The medicine-pockets may themselves be damped, or not, as desired, depending on their contents and purpose.

It is evident that the belt may be so constructed that the series of voltaic batteries may be removed for the purpose of wetting in vinegar and returned to a position, substantially as shown.

What I claim as my invention, and desire to secure by Letters Patent, is as follows:

1. A medicated voltaic belt consisting of a series of pockets containing alternately suitable medicinal substances, and voltaic batteries connected by a conductor, B, substantially as set forth.

2. A medicated voltaic belt consisting of a series of voltaic batteries suitably connected by a conductor, B, and secured in a belt of porous material provided with pockets containing suitable medicinal substances adapted to come between said batteries, substantially as and for the purpose set forth.

In testimony whereof I affix my signature in presence of two witnesses.

CYRUS U. HOKE.

Witnesses:
W. G. STEWART,
C. J. DWIGHT.